(12) United States Patent
Wei et al.

(10) Patent No.: US 8,069,384 B2
(45) Date of Patent: Nov. 29, 2011

(54) SCANNING REASSIGNED DATA STORAGE LOCATIONS

(75) Inventors: Bo Wei, Singapore (SG); Patrick Tai Heng Wong, Singapore (SG); MingZhong Ding, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 254 days.

(21) Appl. No.: 12/480,087

(22) Filed: Jun. 8, 2009

(65) Prior Publication Data

US 2010/0313076 A1 Dec. 9, 2010

(51) Int. Cl.
*G11C 29/00* (2006.01)
*G06F 11/00* (2006.01)

(52) U.S. Cl. ............ 714/723; 714/42; 714/54; 714/6.1; 714/6.11; 714/6.13; 714/6.2; 714/710; 714/711; 714/718

(58) Field of Classification Search .............. 714/42, 714/54, 6.1, 6.11, 6.13, 6.2, 710, 711, 718, 714/723
See application file for complete search history.

(56) References Cited

U.S. PATENT DOCUMENTS

| | | | | |
|---|---|---|---|---|
| 5,937,435 A * | 8/1999 | Dobbek et al. | ............... | 711/202 |
| 6,011,733 A * | 1/2000 | Fischer et al. | ............... | 365/200 |
| 6,034,831 A * | 3/2000 | Dobbek et al. | ............... | 360/53 |
| 6,118,608 A * | 9/2000 | Kakihara et al. | ............... | 360/53 |
| 6,263,459 B1 | 7/2001 | Schibilla | | |
| 6,282,670 B1 | 8/2001 | Rezaul Islam et al. | | |
| 6,289,484 B1 | 9/2001 | Rothbert et al. | | |
| 6,384,999 B1 * | 5/2002 | Schibilla | ............... | 360/53 |
| 6,393,580 B1 * | 5/2002 | Harada | ............... | 714/2 |
| 6,490,691 B1 * | 12/2002 | Kimura et al. | ............... | 714/5.1 |
| 6,530,034 B1 * | 3/2003 | Okada et al. | ............... | 714/5.11 |
| 6,535,995 B1 * | 3/2003 | Dobbek | ............... | 714/6.13 |
| 6,545,833 B1 | 4/2003 | Ee et al. | | |
| 6,574,699 B1 * | 6/2003 | Dobbek | ............... | 711/4 |
| 6,728,899 B1 * | 4/2004 | Ng et al. | ............... | 714/6.13 |
| 6,728,910 B1 * | 4/2004 | Huang | ............... | 714/711 |
| 6,766,465 B2 * | 7/2004 | Harada | ............... | 714/2 |
| 6,854,071 B2 * | 2/2005 | King et al. | ............... | 714/6.13 |
| 7,055,013 B2 * | 5/2006 | de Brisson | ............... | 711/170 |
| 7,103,732 B1 * | 9/2006 | Chang et al. | ............... | 711/156 |
| 7,310,745 B2 | 12/2007 | Schnapp et al. | | |
| 7,487,306 B2 * | 2/2009 | Blacquiere et al. | ............... | 711/159 |
| 7,487,388 B2 | 2/2009 | Kim et al. | | |
| 7,490,261 B2 | 2/2009 | Gaertner et al. | | |
| 7,490,263 B2 * | 2/2009 | King | ............... | 714/6.13 |
| 7,684,138 B2 * | 3/2010 | Kitamura et al. | ............... | 360/51 |
| 2004/0190183 A1 * | 9/2004 | Tamai et al. | ............... | 360/69 |
| 2006/0117242 A1 * | 6/2006 | Hamelinck et al. | ............... | 714/763 |
| 2006/0146675 A1 * | 7/2006 | Shin | ............... | 369/53.17 |
| 2006/0171057 A1 | 8/2006 | Lee | | |
| 2007/0033451 A1 * | 2/2007 | Burg | ............... | 714/718 |
| 2007/0174678 A1 * | 7/2007 | King | ............... | 714/8 |
| 2009/0063896 A1 * | 3/2009 | Lastras-Montano et al. | ..... | 714/8 |
| 2009/0204847 A1 * | 8/2009 | Lakhani et al. | ............... | 714/8 |
| 2010/0142275 A1 * | 6/2010 | Yogev et al. | ............... | 365/185.09 |

* cited by examiner

*Primary Examiner* — John J Tabone, Jr.
(74) *Attorney, Agent, or Firm* — Braden Katterheinrich (57) ABSTRACT

An aspect of the present disclosure relates to scanning reassigned data storage locations. In one example, a reassignment table is accessed to identify a deallocated data storage location and scan the deallocated data storage location for media defects.

12 Claims, 9 Drawing Sheets

| | Original PBA | Alternate PBA | Pending? | Scanned? | # of Scans |
|---|---|---|---|---|---|
| 414 | 100 (LBA 100) | 100000 | -- | No | |
| 416 | 200 (LBA 200) | 200000 | -- | No | |
| 418 | 300 (LBA 300) | 300000 | -- | No | |
| 420 | 400 (LBA 400) | -- | Yes | -- | |
| 422 | 500 (LBA 500) | -- | Yes | -- | |
| 424 | 600 (LBA 600) | -- | Yes | -- | |
| 426 | | | | | |

FIG. 4A

| | Original PBA | Alternate PBA | Pending? | Scanned? | # of Scans |
|---|---|---|---|---|---|
| 414 | | | | | |
| 416 | 200 (LBA 200) | 200000 | -- | Yes | |
| 418 | 300 (LBA 300) | 300000 | -- | No | 1 |
| 420 | 400 (LBA 400) | -- | Yes | -- | |
| 422 | | | | | |
| 424 | 600 (LBA 600) | 600000 | -- | No | |
| 426 | | | | | |

SCANNING REASSIGNED DATA STORAGE LOCATIONS

BACKGROUND

The present disclosure relates generally to data storage systems, and more particularly, but not by limitation, to data reassignment in data storage systems.

Data storage systems are used in a variety of applications. Many different types of data storage systems exist, such as solid-state and non-solid state systems. Flash memory, random access memory (RAM), and dynamic random access memory (DRAM) are examples of solid-state memory devices. Further, magnetic and optical discs are examples of non-solid state memory devices.

Data storage systems can comprise one or more types of data storage media having a plurality of data storage locations. For example, a disc drive includes at least one rotating disc or storage medium for storage of digital information in a plurality of circular, concentric data tracks. The data tracks can be divided into a plurality of data storage locations, such as sectors or segments. Further, an exemplary solid-state memory comprises one or more semiconductor-based components for storing data. For instance, an exemplary flash memory device stores information in data storage locations comprising an array of memory cells made from floating-gate transistors, for example. The memory cells can include single-level cell (SLC) devices, where each cell stores only one bit of information, and/or multi-level cell (MLC) devices, where each cell stores more than one bit of information.

The discussion above is merely provided for general background information and is not intended to be used as an aid in determining the scope of the claimed subject matter.

SUMMARY

An aspect of the present disclosure relates to scanning reassigned data storage locations. In one example, a reassignment table is accessed to identify a deallocated data storage location and scan the deallocated data storage location for media defects.

In one exemplary embodiment, a method is provided and includes receiving a command for a data operation for a first set of addresses associated with storage locations of a data storage medium. The method includes performing the data operation on the data storage medium for the first set of addresses during a first portion of a time period associated with execution of the data command. The method also includes scanning at least one storage location for media defects during a second portion of the time period. The at least one storage location has an address that is different than the addresses in the first set.

In another exemplary embodiment, a controller is provided and includes a communication path for communicating with at least one memory device. The at least one memory device has a plurality of original data storage locations and a plurality of spare data storage locations. The controller also includes a reassignment database having a plurality of entries. Each entry includes information de-allocating at least one of the original data storage locations and mapping the at least one de-allocated original data storage location to at least one of the spare data storage locations. The controller also includes a processing component configured to implement a reassignment database scan mode to identify a de-allocated original data storage location, scan the de-allocated original storage location for media defects, and reallocate the original storage location based on the scan. The processing component selects the reassignment database scan mode from a plurality of reassignment database scan modes.

In another exemplary embodiment, a data storage system is provided and includes at least one data storage medium comprising a plurality of original data storage locations and a plurality of alternate data storage locations. The data storage system also includes a reassignment table having a plurality of entries. An entry includes information de-allocating one of the original data storage locations and mapping the de-allocated original data storage location to one of the alternate data storage locations. The data storage system also includes a controller configured to receive a command for a data operation, obtain a time value associated with a time period for execution of the data command, execute the data operation, and implement a reassignment scan mode based on the time value and execution of the data operation.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
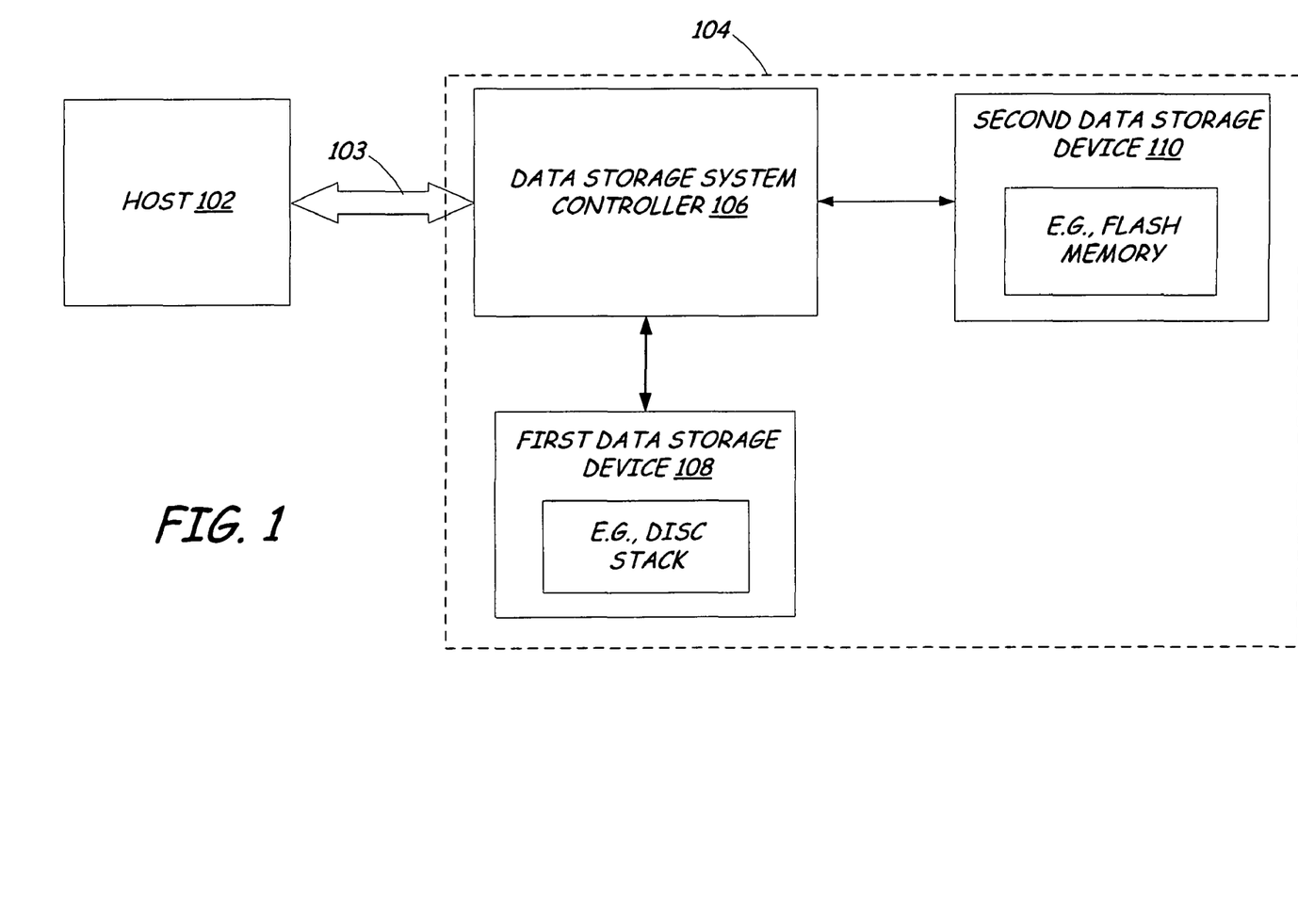
FIG. 1 is a schematic diagram of an exemplary data storage system.

FIG. 1 is a schematic diagram of an exemplary data storage system 104 that includes at least one data storage device. In the illustrated embodiment, data storage system 104 is communicatively coupled to a host 102. Host 102 can include any device, component, system, sub-system, application, and the like, that communicates (e.g., sends, receives, accesses, requests, processes data) with data storage system 104. In one example, host 102 comprises a computing device such as, but not limited to, a personal computer, laptop computer, server, portable electronic device, mobile device, digital music player, mobile phone, personal digital assistant (PDA), to name a few. It is noted that data storage system 104 can be included within or can be external to host 102. For example, in one embodiment data storage system 104 comprises a data storage drive, such as, but not limited to, a hard disc drive (HDD), a solid-state drive (SDD), a "hybrid" drive (e.g., a hybrid hard drive (HHD)), and the like, that is coupled to the host 102 using any suitable type of data connection.

Data storage system 104 includes a controller 106 that is configured to communicate with host 102 through a data channel 103. Data storage system 104 includes one or more data storage devices. As illustrated in FIG. 1, data storage system 104 includes a first data storage device 108 and a second data storage device 110. Controller 106 is configured to store data to and read data from storage devices 108 and 110. In other embodiments, system 104 can include more than or less than two storage devices.

Examples of storage media in device 108 include, but are not limited to, a disc stack having one or more data storage discs. However, it is noted that in other embodiments data storage device 108 can include any suitable type of memory components) such as other forms of non-volatile memory as well as volatile memory. Some examples include, but are not limited to, floppy discs, magnetic discs, optical discs, magnetic tapes, and solid-state storage components, to name a few.

Data storage device 110 also includes storage media configured to stored data. In the illustrated embodiment, data storage device 110 comprises a different type of media and/or is separate (e.g., physically spaced) from device 108. Further, device 110 can be configured for intermediate data storage (e.g., a data buffer, a data cache). Alternatively, or in addition, data storage device 110 can be configured for persistent and/or long-term data storage. For example, data storage device 110 can include non-volatile data memory devices as well as volatile data memory devices.

In the embodiment illustrated in FIG. 1, data storage device 110 comprises non-volatile solid-state memory, illustratively flash memory. However, while device 110 is described herein with respect to flash memory it is noted that in other embodiments data storage device 110 can include other forms of memory. Examples include, but are not limited to, hard discs, floppy discs, magnetic discs, optical discs, magnetic tapes, electrically erasable programmable read-only memory (EEPROM), non-volatile random access memory (NVRAM), and other forms of solid-state storage components, to name a few.

Figure 2:
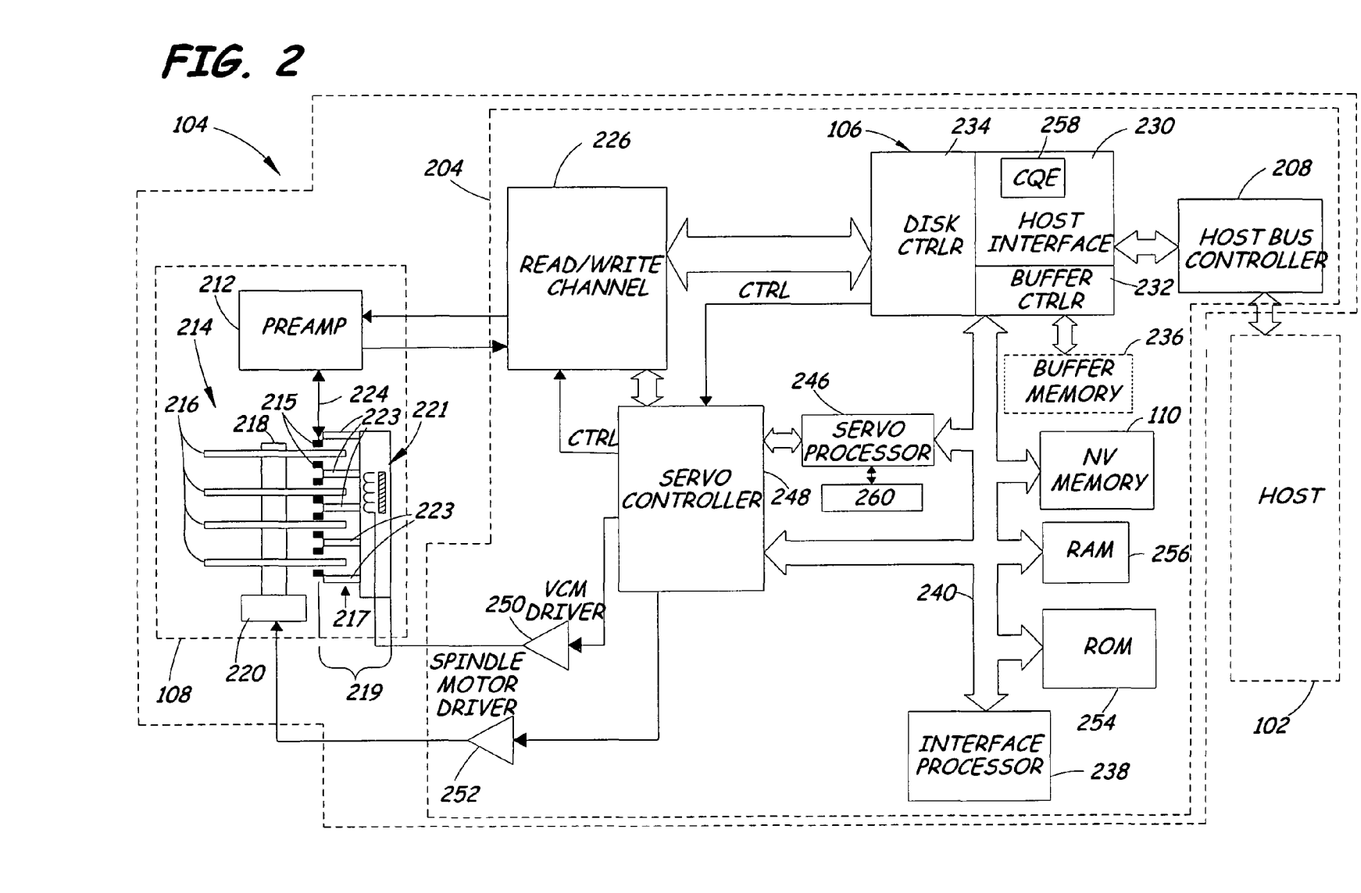
FIG. 2 is a schematic diagram of one embodiment of the data storage system illustrated in FIG. 1.

FIG. 2 is a schematic diagram illustrating one exemplary embodiment of data storage system 104. Data storage system 104 includes a plurality of data storage locations for storing data. The data storage locations can comprise portions of data storage media in system 104 such as, but not limited to, segments, sectors, tracks, blocks, and/or pages of the data storage media, to name a few. For example, as illustrated in FIG. 2 data storage system 104 includes first data storage device 108 (illustratively a disc drive employing a head stack assembly (HSA) 217) having a plurality of data storage locations (e.g., disc sectors) and a second data storage device 110 (illustratively a non-volatile (NV) memory such as flash memory) having a plurality of data storage locations (e.g., flash blocks).

Data storage system 104 includes a printed circuit board assembly (PCBA) 204 that includes circuitry and processors, which provide for example a data storage system controller 106 for communicating between host 102 and data storage devices 108 and 110. Host 102 can include a microprocessor-based data processing system such as a personal computer or other system capable of performing a sequence of logical operations. Data is transmitted between host 102 and PCBA 204 via a host bus controller 208.

HSA 217 illustratively includes an actuator assembly 219, a preamplifier 212, and a disc assembly 214. Disc assembly 214 includes a plurality of media discs 216 stacked on a spindle assembly 218. Spindle assembly 218 is mechanically coupled to a spindle motor 220 for rotating the disc at a high rate of speed.

Actuator assembly 219 includes a voice coil motor 221 and multiple actuator arms 223. Located at the end of actuator arms 223 are heads 215, which are associated with a respective disc surface. Heads 215 communicate with PCBA 204 via a cable assembly 224 connected to preamplifier 212 for reading and writing data to the associated disc surface(s). Preamplifier 212 provides an amplified signal to a read/write channel 226 of PCBA 204. Read/write channel 226 performs encoding and decoding of data written to and read from the disc.

A servo processor 246 provides intelligent control of actuator assembly 219 and spindle motor 220 through a servo controller 248. By commands issued to servo controller 248 by servo processor 246, VCM driver 250 is coupled to move actuator assembly 219 and spindle motor driver 252 is coupled to maintain a desired spin rate of spindle motor 220.

In the illustrated embodiment, controller 106 includes a host interface 230, a buffer controller 232, and a disc controller 234. Host interface 230 communicates with host 102 via host bus controller 208 by receiving commands and data from (and transmitting status and data back to) host 102. In one embodiment, a command queing engine (CQE) 258 is incorporated in host interface 230. Buffer controller 232 controls a buffer memory 236, which can include non-volatile and/or volatile memory. It is noted that buffer memory 236 can be provided with, or can be separate from, NV memory 110.

In one embodiment, disc controller 234 tracks the timing of data sectors passing under a currently selected head and accordingly sends data to and receives data from read/write channel 226. Controller 106 can also provide for error correction and error detection on data transmitted to and read from discs 214.

In one embodiment, an interface processor 238 manages a queue of commands received from host 102 with the assistance of the CQE 258 embedded in host interface 230. Interface processor 238 interfaces with functional elements of PCBA 204 over a bus 240 for transfer of commands, data, and status.

Operational programs can be stored in read-only memory (ROM) 254 and/or any other non-volatile storage, such as NV memory or disc, and can be loaded into random access memory (RAM) or program loading memory 256 for execution by interface processor 238. Suitably, servo processor 246 can have integrated or separate memory 260 for storage of servo programs.

In some instances, data storage locations can become defective or "bad." For example, it sometimes happens that data storage locations (e.g., segments, sectors, tracks, blocks, pages, etc.) of a storage medium become defective during the manufacturing process of the storage medium. Further, in some instances data storage locations can become defective during normal operation. In some data storage media, defects can arise at various times during the lifetime of the data storage media (e.g., grown defects).

For a disc drive, grown defects can include, for example, invading foreign particles which become embedded onto a surface of the storage medium, or external shocks to the storage system which can cause the transducer to nick or crash onto a surface of the storage medium. For a data storage device having solid-state memory, data storage locations can become defective as a result of memory wear, for example. It is noted that these are examples of media defects and are not intended to limit the scope of the concepts described herein.

Defective data storage locations can pose temporary and/or permanent data retrieval problems. To accommodate media defects such as grown defects, a number of spare data storage locations can be provided in system 104. For example, spare data storage locations can be provided in data storage device 108, data storage device 110, and/or other data storage component in system 104. The spare data storage locations can be used to replace defective data storage locations in system 104 (i.e., data storage locations in device(s) 108 and/or 110).

To accommodate defective data storage locations controller 106 can be configured to carry out a reassignment or reallocation of data storage locations. For instance, if a defective data storage location is discovered, the defective data storage location is reassigned to one or more spare data storage locations. For example, the addresses and data of the defective data storage locations in device 108 can be reassigned to spare data storage locations in device 108 and/or spare data storage locations in device 110. Similarly, the addresses and data of the defective data storage locations in device 110 can be reassigned to spare data storage locations in device 110 and/or spare data storage locations in device 108.

Figure 3:
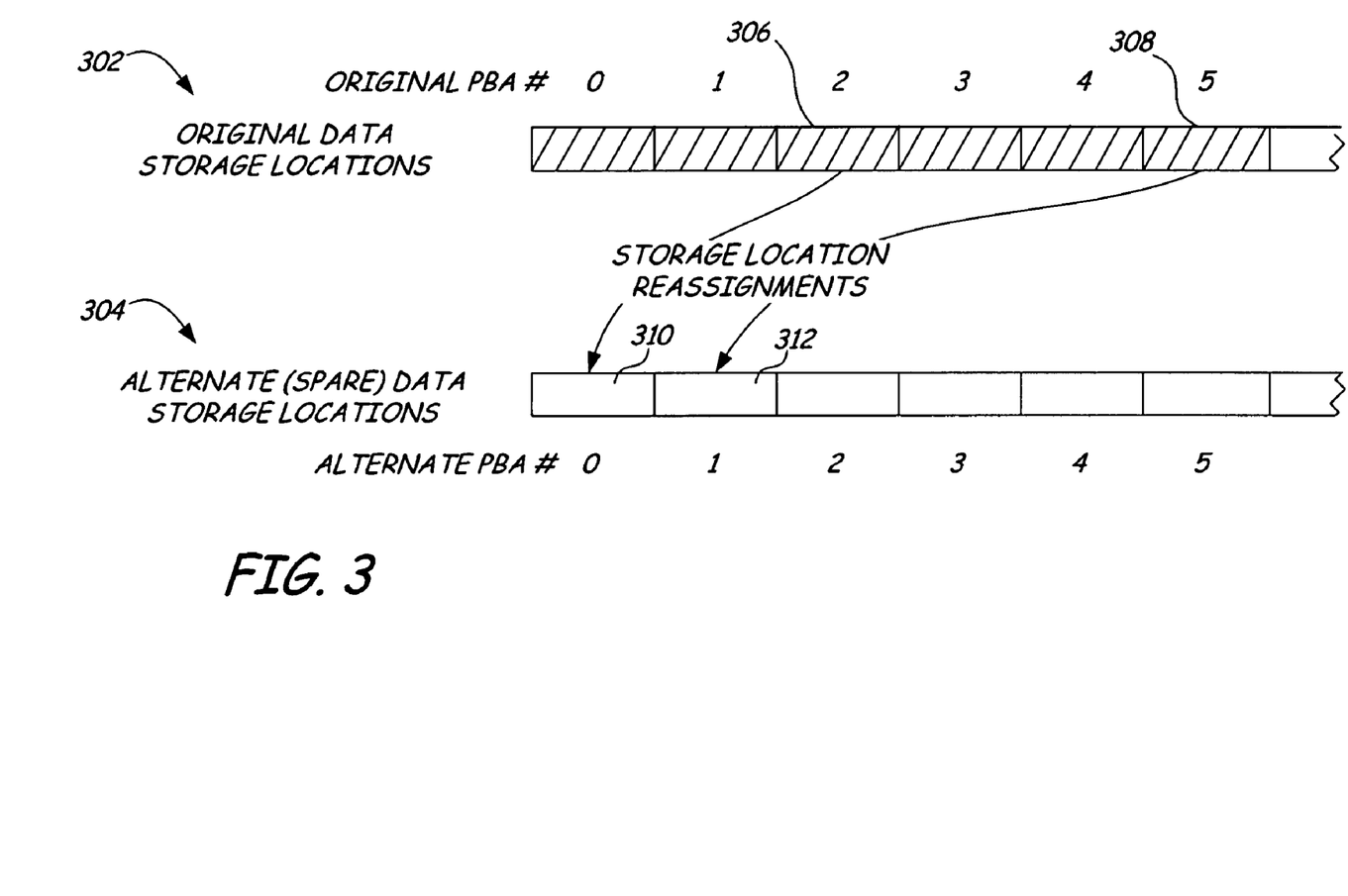
FIG. 3 is a schematic diagram illustrating an exemplary reassignment of data storage locations, under one embodiment.

FIG. 3 illustrates an exemplary reassignment of data storage locations. A plurality of original data storage locations 302 are accessed during a read or write operation. In one example, original data storage locations 302 comprise portions of data storage devices 108 and/or 110. Data errors were detected at data storage locations 306 and 308. Original data storage locations 306 and 308 are then reassigned to spare or alternate data storage locations 310 and 312, respectively, in spare pool 304. The data originally assigned to locations 306 and 308 are stored in locations 310 and 312, respectively. In one embodiment, data storage locations 304 comprise portions of data storage devices 108 and/or 110.

The determination of the defectiveness of a data storage location is often determined during a write or read operation. For instance, during a data operation such as a data write operation controller 106 can encounter a data error. The controller 106 can implement a data retry in an attempt to correct the encountered data error. In one example, system 104 performs a "mini-cert" operation in which a write verify is performed that includes a write operation followed by a read operation to determine if the data storage location contains a media defect.

In some instances, data errors can occur in data storage system 104 as a result of one or more factors not related to media defects, which can cause a "false" data reassignment. For example, data storage system 104 can be exposed to momentary shock and/or vibration events, which can cause data errors. For instance, data storage system 104 can be used in consumer electronic products, such as digital music players, cell phones, personal data assistants, and the like. In such environments, data storage system 104 can frequently be exposed to momentary shock and/or vibration events due to the portability and/or use of the product in which it is located. These vibrations and/or shock events can cause data errors during operation of system 104. For example, burst errors are types of error that data storage system 104 can experience. Further, vibrations and/or shock can cause the read/write head(s) 215 to significantly deviate from a center of a desired track of medium 216 thus causing a data error in a data write (or read) operation to the desired track, for instance. The vibration and/or shock can cause system 104 to determine incorrectly that one or more data storage locations (e.g., segments or sectors) of medium 216 contain media defects. Thus, in some instances a data reassignment is implemented to spare data storage locations even though the media of the original data storage locations is not defective.

Figure 4A:
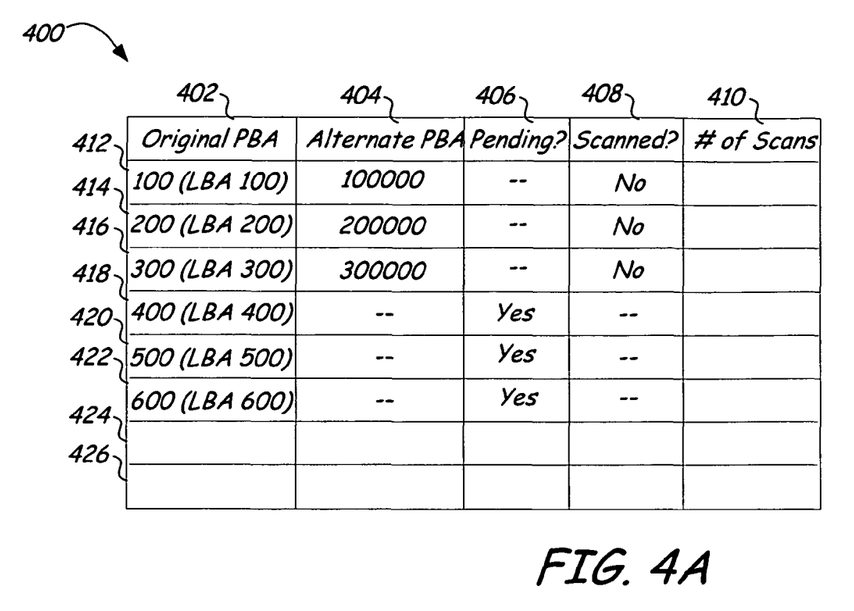
FIGS. 4A and 4B illustrate an exemplary reassignment table.

"False" reassignments can have detrimental consequences. For example, false reassignment of data storage locations can vastly limit an amount of capacity that a data storage system can utilize. A data storage system can run out of spare data storage space. A data storage system that runs out of spare data storage locations is unable to handle new grown defects and can function abnormally. In one example, a reassignment (or reallocation) list or table associated with the spare data storage locations in system 104 can grow rapidly and become full as a result of false reassignments. A full reassignment list can render the data storage system unable to handle new grown defects FIG. 4A illustrates an exemplary database 400 that includes information pertaining to reassigned data storage locations. In one embodiment, database 400 is stored in data storage system 104, for example in controller 106. In the illustrated embodiment, the database 400 is illustratively a reassignment or reallocation table that includes a mapping of original data storage locations to alternate or spare data storage locations. While some of the embodiments described herein are described in the context of a reassignment table 400, any suitable structure can be utilized.

Reassignment table 400 includes a plurality of columns 402-410 and a plurality of rows 412-426. As illustrated, each of rows 412-426 comprises an entry pertaining to a particular data storage location reassignment. Column 402 includes an indication of the original data storage location address and column 404 includes an indication of the alternate or spare data storage location address to which the original location has been reassigned. In the example illustrated in FIG. 4A, the data storage location having a physical block address (PBA) of 100 has been reassigned to a spare data storage location having a PBA of 100,000. Column 402 can also include an indication of the associated logical block address (LBA) for each entry. For instance, in the embodiment illustrated in FIG. 4A the data associated with logical block address (LBA) 100 was originally assigned to physical block address (PBA) 100, but was reassigned (due to a detected error) to physical block address (PBA) 100,000.

Reassignment table 400 also includes a column 406 that indicates whether the reassignment is pending. In other words, column 406 indicates if the data for the original data storage location in column 402 has actually been stored to the alternate address indicated in column 404. For instance, in the embodiment illustrated in FIG. 4A the data storage locations having physical block addresses (PBA) of 400, 500, and 600 have been designated for reassignment but have not yet been assigned to particular alternate or spare data storage locations.

Reassignment table 400 also includes a column 408 that indicates whether a reassignment scan has been performed for the entry. As will be discussed below, reassignment scans can be performed on the entries in table 400 to validate that the data reassignment is a "true" data reassignment. In other words, the original data storage location 402 can be analyzed to determine if the original data storage location 402 has a media defect and the entry is not a "false" reassignment.

Reassignment table 400 can also include a column 410 that indicates a number of times the original storage location 402 for the entry has been scanned for media defects. In one embodiment, column 408 is changed to a "Yes" status if column 410 reaches a predetermined threshold level.

Figure 5:
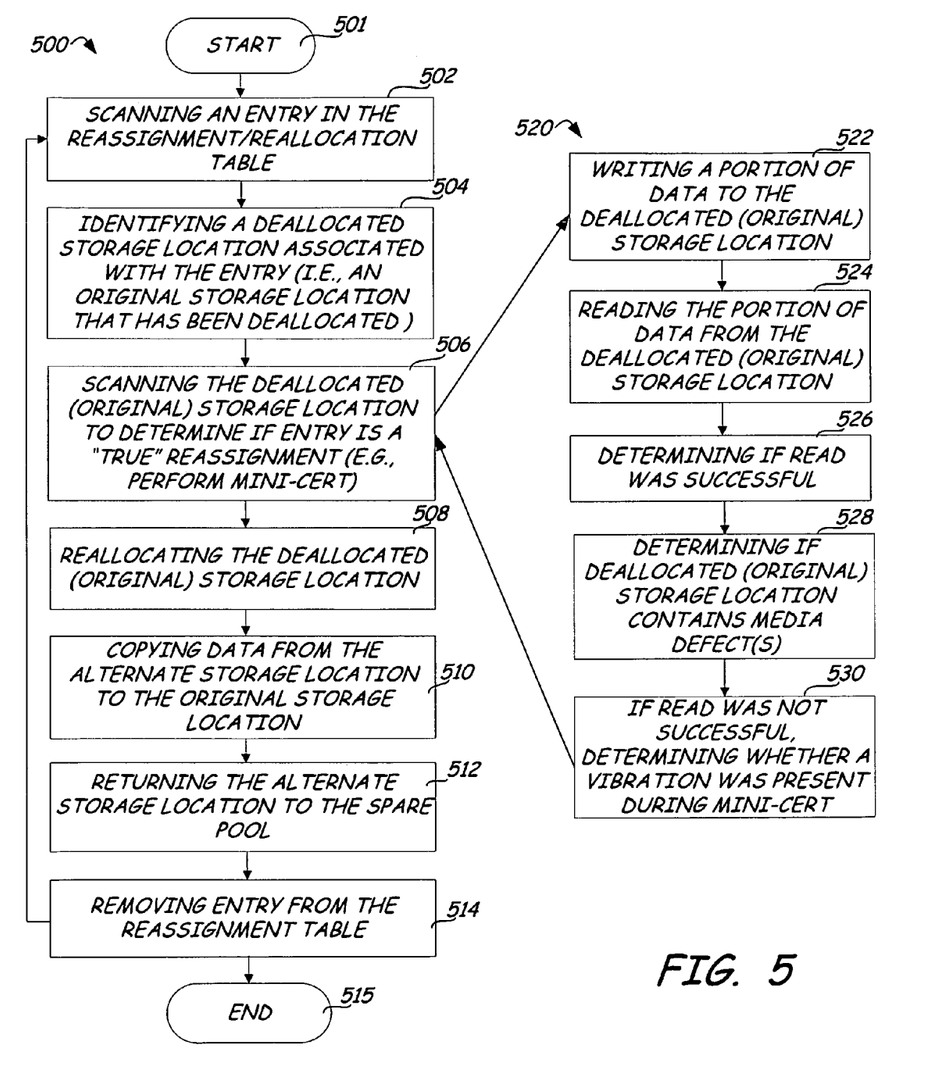
FIG. 5 illustrates one embodiment of a method of scanning entries in a reassignment table.

FIG. 5 illustrates a method 500 for scanning data storage location reassignments. Method 500 can be utilized to verify a reassigned or deallocated data storage location and identify false data storage location reassignments. In accordance with one embodiment, method 500 is utilized to "clean up" or "shrink" a number of entries in a reassignment table, such as table 400. While method 500 is described in the context of reassignment table 400 illustrated in FIG. 4A, the aspects described in the present specification are not limited to these described embodiments.

Method 500 starts at block 501. At step 502, an entry in the reassignment table 400 is identified and scanned. At step 504, a deallocated storage location associated with the entry is identified. For instance, steps 502 and 504 scan entry 412 in table 400 and identify that the data storage location having a PBA of 100 is a deallocated (i.e., original) data storage location associated with entry 412. At step 506, the method 500 scans the deallocated (original) storage location to determine if the entry is a "true" reassignment. For instance, the method scans PBA 100 to determine if a media defect exists and whether the data storage location reassignment was "false." In one embodiment, method 500 performs a "mini-cert" operation on the original data storage location. FIG. 5 illustrates an exemplary "mini-cert" operation 520.

At step 522, a portion of data is written to the deallocated or original storage location (i.e., PBA 100). The portion of data is then read from the storage location (PBA 100) at step 524. Step 526 determines if the read was successful. Based on the result at step 526, step 528 determines whether the original storage location (i.e., PBA 100) contains media defects. In one embodiment, if the read was not successful, the method can determine at step 530 whether a vibration was present during the read at step 524. If the method determines that a vibration was present, the method can perform further operations such as, but not limited to, re-scanning the data storage location and/or repeating the mini-cert operation.

In one example, step 530 determines whether a vibration was present based on an output from a shock sensor associated with the data storage system. In another example, controller firmware can be configured to send a vibration detection command, such as to a servo module, which can analyze a position error signal (PES) and/or a shock sensor status.

At step 508, if the method determines that the deallocated (original) storage location does not contain media defects (i.e., the reassignment was "false") the deallocated storage location is reallocated. For instance, at step 510 the data from the alternate storage location (i.e., PBA 100,000) is copied back to the original storage location (i.e., PBA 100) and the alternate storage location is returned to the pool of spare storage locations at step 512. The entry 412 is removed from the reassignment table at step 514.

In accordance with one embodiment, method 500 can also process any pending reassignments (i.e., entries in table 400 that are indicated as pending but have not yet been reassigned to an alternate data storage location). In FIG. 4A, entries 418-422 are pending reassignments.

Figure 4B:
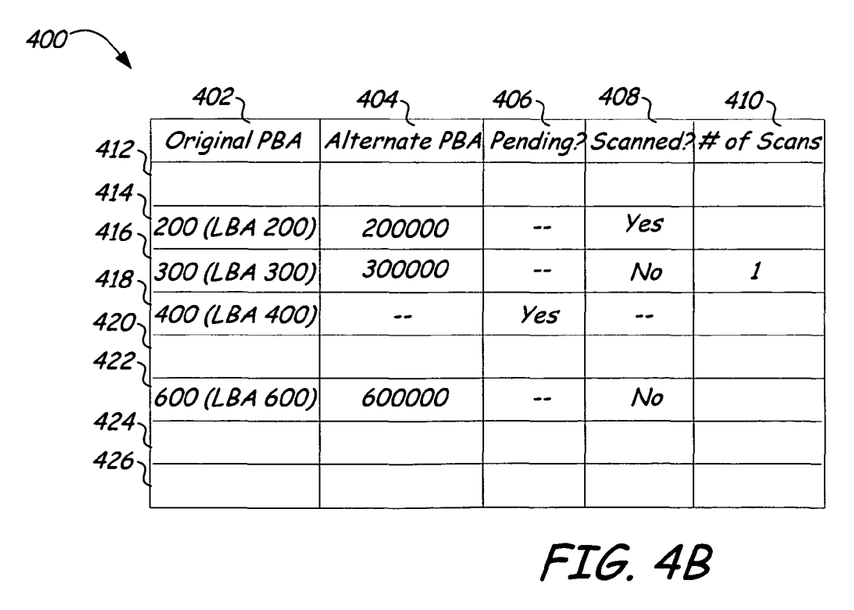

FIG. 4B illustrates an example of table 400 after the entries have been scanned using method 500. The original PBA 100 in entry 412 was scanned and passed the mini-cert operation. Thus, entry 412 was deemed to be a "false" reassignment and the entry 412 was removed. The original data storage location in entry 414 (PBA 200) failed the mini-cert operation and was designated as a true reassignment. The column 408 for entry 414 was set to a true or "Yes" value. The original data storage location (PBA 300) associated with entry 416 was scanned but could not be validated; however, a vibration was detected during the mini-cert operation. Because a vibration was detected, the scanned flag in column 408 was not set and entry 416 is designated to be scanned at a later time.

In FIG. 4A, entries 418-422 were marked as pending reassignments. After the scan, the data storage location (PBA 400) associated with entry 418 could not be read back and the reassignment entry remains pending. The data storage location (PBA 500) associated with entry 420 was read back and passed the mini-cert operation. The entry 420 is therefore designated as a false reassignment and the entry 420 was removed from table 400. The data storage location (PBA 600) associated with entry 422 was read back and failed the mini-cert operation. The entry 422 is therefore reassigned to an alternate data storage location (i.e., PBA 600,000) and the pending flag in column 406 for entry 422 is removed. It is noted that FIG. 4B is provided to aid in illustrating method 500 in the context of exemplary table 400 and is not intended to limit the scope of the concepts described herein.

Figure 6:
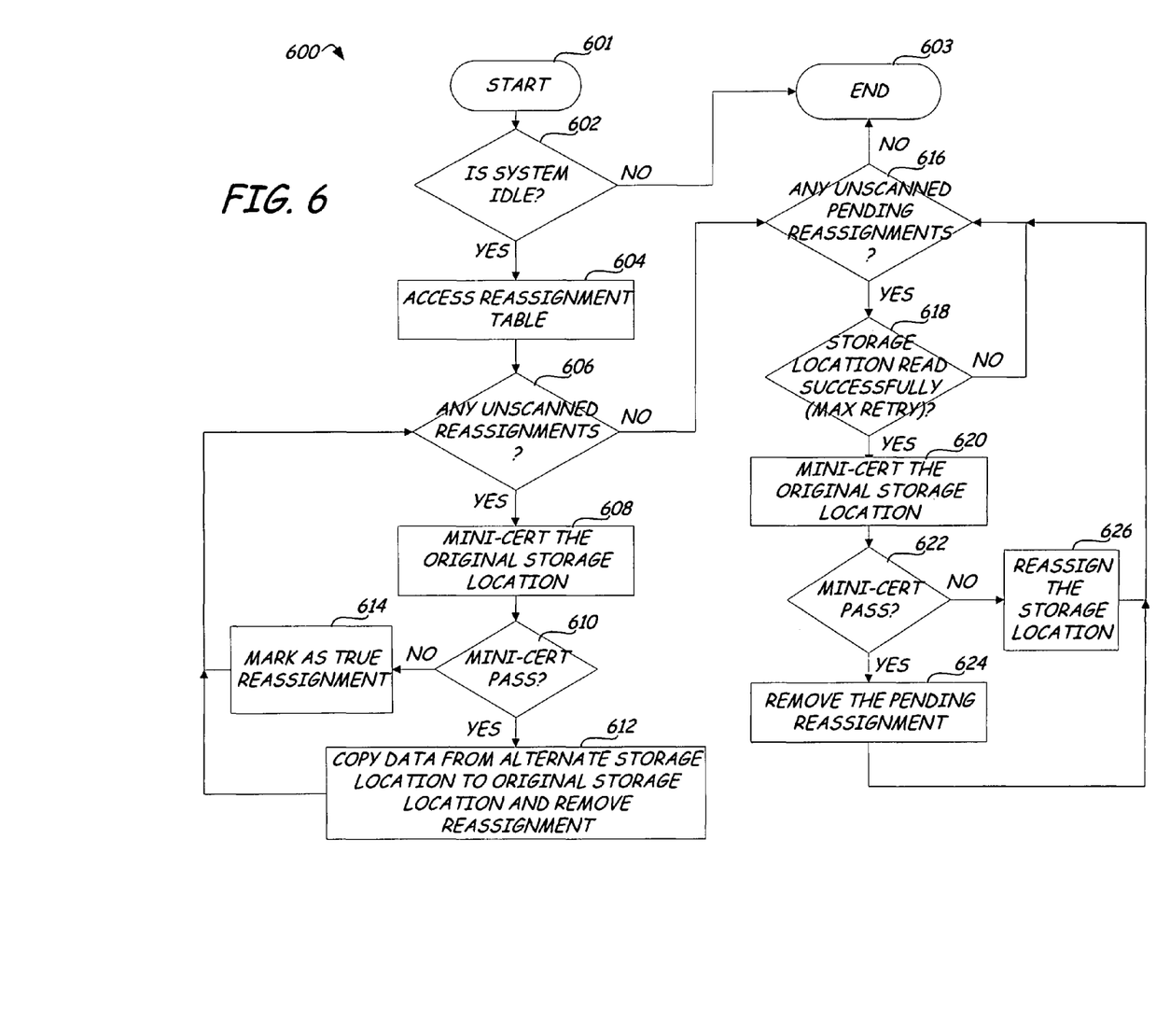
FIG. 6 illustrates one embodiment of a method of scanning entries in a reassignment table.

FIG. 6 illustrates one embodiment of a method 600 for scanning a reassignment table to identify and remove false data storage location reassignments. Method 600 is referred to herein as an "offline" reassignment scan as it can be, under one embodiment, triggered when the data storage system is idle to limit, or prevent, interferences with normal activity or performance of the data storage system.

Method 600 begins at block 601. At step 602, the method 600 determines whether the data storage system is idle and/or "stable". For example, step 602 determines whether the data storage system is currently performing a data write or read operation. In another example, step 602 can determine whether a vibration or shock is present at the data storage system.

At step 604, the method accesses the reassignment table and determines whether there are any entries in the table representing unscanned reassignments at step 606. For instance, as illustrated in FIG. 4A entries 412-416 comprise unscanned data storage location reassignments.

At step 608, the method selects one or more of the entries in the table representing unscanned reassignments and performs a mini-cert operation on the original data storage location associated with the selected entries. In one embodiment, step 608 is similar to method 520 illustrated in FIG. 5. At step 610, if the mini-cert operation passes (i.e., the data was read successfully), the method proceeds to step 612 wherein the data is copied from the alternate data storage location to the original data storage location. The entry is determined to be a false reassignment and the entry is removed from the reassignment table. If the mini-cert operation does not pass at step 610, the method proceeds to step 614 wherein the reassignment entry is marked as a true reassignment. For example, the flag in column 408 of table 400 is set to a true or "Yes" value. The method returns to step 606 where any additional unscanned reassignments are identified and steps 608-614 can be repeated.

Otherwise, the method 600 proceeds to step 616 wherein the method determines if there are any unscanned pending reassignments identified in the table. For example, as illustrated in FIG. 4A entries 418-422 comprise pending data storage location reassignments. At step 618, the method determines whether the data can be read for the pending data storage location. If the data can be read, the method proceeds to step 620 wherein a mini-cert operation is performed on the original data storage location to determine if the original data storage location contains a media defect. If the data storage location passes the mini-cert operation, the method proceeds to step 624 wherein the pending reassignment entry is removed from the reassignment table. If the data storage location does not pass the mini-cert operation, the method proceeds to step 626 wherein the reassignment is performed and the data storage location is reassigned to an alternate or spare data storage location.

At step 618, if the data is not read successfully the read can be repeated, for example, with a maximum number of retry operations. The method returns to step 616. Steps 618-626 can be repeated for any additional pending reassignments. The method ends at step 603.

Figure 7:
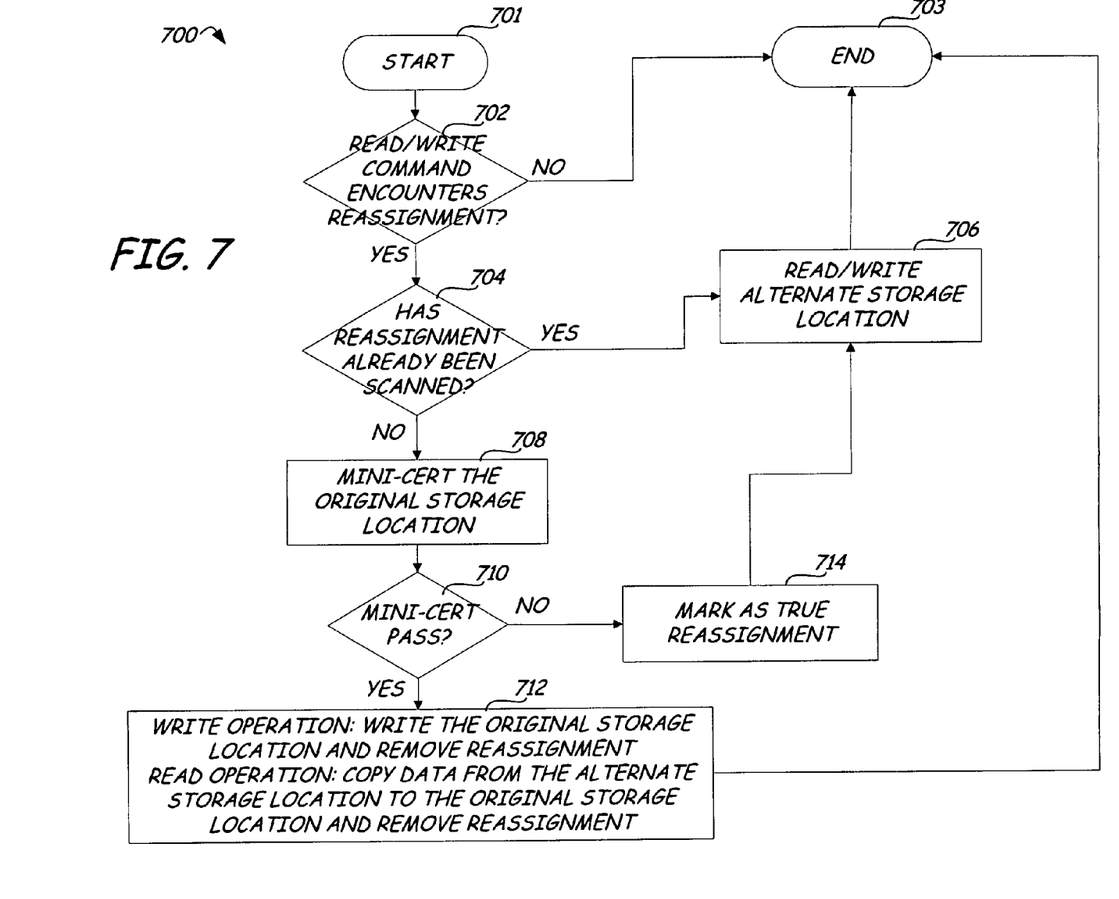
FIG. 7 illustrates one embodiment of a method of scanning entries in a reassignment table.

FIG. 7 illustrates one embodiment of a method 700 for scanning a reassignment table to identify and remove false data storage location reassignments. Method 700 is referred to herein as an "online" reassignment scan as it can be, under one embodiment, performed during and/or associated with a data operation in the data storage system. In one example, method 700 is triggered when the data storage system is not idle. For example, method 700 begins at block 701 when a data read or write operation is initiated.

At step 702, the read or write command encounters a reassigned data storage location. For example, the read or write request includes a physical block address included in column 402 of table 400. At step 704, the method determines whether the data storage location reassignment has already been scanned, for example by checking column 408. If the entry in the reassignment table has already been scanned, the method proceeds to block 706 wherein the read or write operation is performed at the alternate data storage location indicated by column 404.

If step 704 determines that the reassignment entry has not been scanned, the method proceeds to step 708 wherein a mini-cert operation is performed on the original data storage location. For instance, with respect to table 400 illustrated in FIG. 4A, if the read or write command encounters physical block address (PBA) 100, in step 708 analyzing comprises checking the physical block address (PBA) 100 for media defects. If the mini-cert operation fails at step 710, the method proceeds to step 714 wherein the reassignment entry in the table is marked as a "true" reassignment. For example, the flag in column 408 can be set to a true or "Yes" value. If the mini-cert operation passes at step 710, the method proceeds to step 712. For a write operation, the data in the write command is written to the original data storage location and the reassignment entry in the reassignment table is removed. For a read operation, the data in the alternate data storage location is copied to the original data storage location and the reassignment entry is removed.

Figure 8:
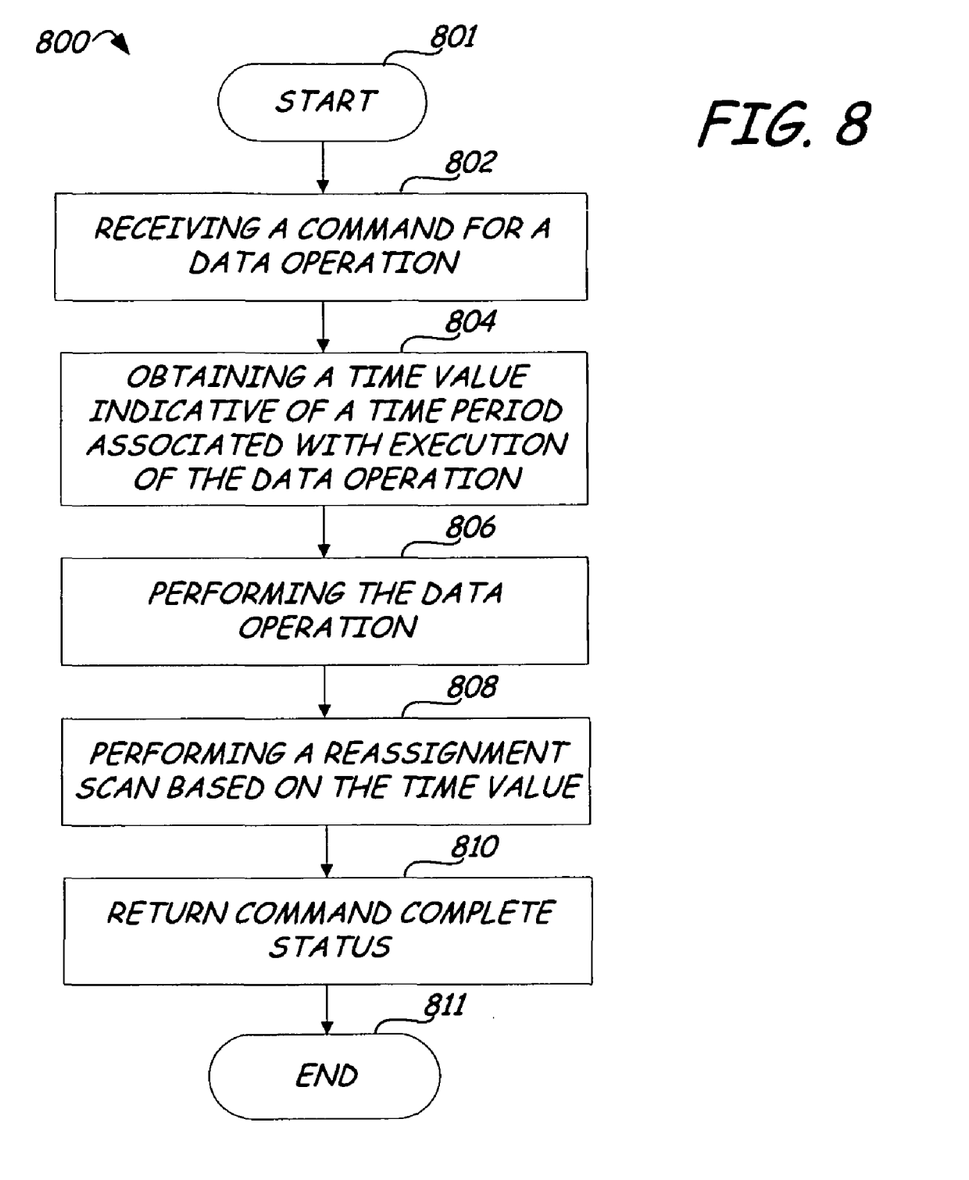
FIG. 8 illustrates one embodiment of a method of scanning entries in a reassignment table.

FIG. 8 illustrates one embodiment of a method 800 for scanning a reassignment table to identify and remove false data storage location reassignments. Method 800 is also referred to herein as an "online" reassignment scan as it can be, under one embodiment, triggered during and/or associated with a data operation in the data storage system. In one example, method 800 is triggered when the data storage system is not idle. For example, method 800 begins at block 801 when a data read or write operation is initiated.

At step 802, a command is received for a data operation such as, but not limited to, read and/or write operations. At step 804, a time value is obtained that is indicative of a time period associated with execution of the data operation. For example, the time value can indicate a period of time within which the data operation is required to complete. In one embodiment, the time value is indicative of a timeout period for the command.

In one embodiment, a host command timeout value is expressly provided to the data storage system. For example, the data storage system can be pre-configured with knowledge of host command timeout periods for various commands. In another example, the host command timeout value can be transmitted to the data storage system separately or with the data command. In another example, the data storage system can estimate the host command timeout value. For instance, the data storage system can estimate the timeout value as a function of an estimated or optimum completion time for the particular command. To illustrate, for an exemplary read command that needs to transfer three continuous tracks of disc data, the optimum completion time is three disc revolutions, in one embodiment. Considering an acceptable amount of retries, reassignments, and overheads equal to 20 disc revolutions, the estimated command completion time can be calculated as 23 disc revolutions (20+3). This value can then be used by the data storage system as the estimated host command timeout.

At step 806, the data operation is performed by the data storage system during a first portion of the command timeout period. In some instances, the data operation is completed by the data storage system during a time that is less than the command timeout period. In this case, a reassignment scan is performed at step 808 to scan one or more data storage location reassignments during a second, residual portion of the command time period. In this manner, the data operation is performed at step 806 during a first portion of the command timeout period and the reassignment scan is performed at step 808 during a second portion of the timeout period. Some or all of the data storage locations that are analyzed during the reassignment scan at step 808 can include data storage locations that were included in the data operation performed at step 806, as well as other data storage locations that were not included in the data operation performed at step 806.

At step 810, the data storage system returns a "command complete" status indication to the host, for example, after the reassignment scan is performed at step 808 and before the command timeout period expires.

In accordance with one embodiment, method 800 "borrows" time from the data operation to perform the reassignment scan of entries in a reassignment table, for example. The reassignment scan can be performed independently and without host knowledge of the reassignment scan.

Figure 9:
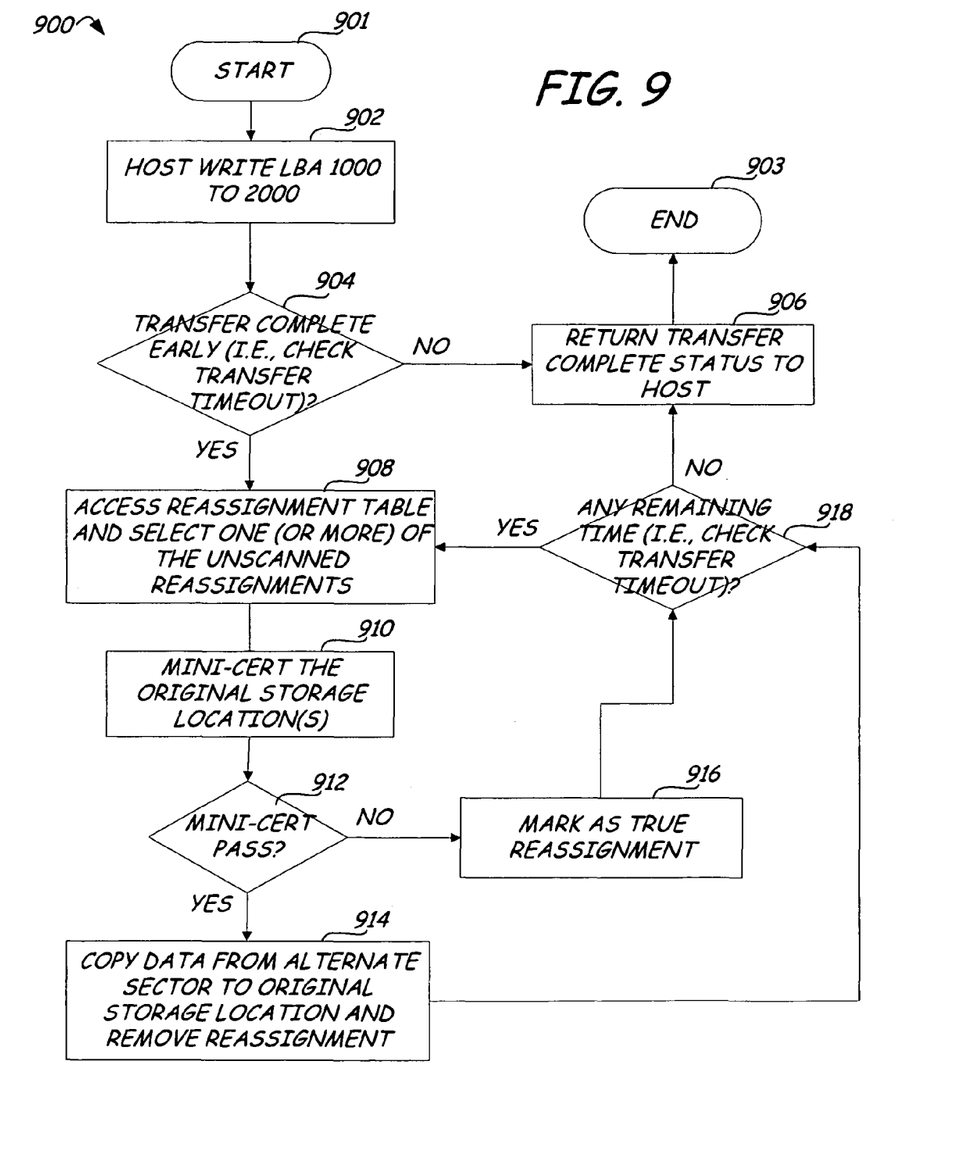
FIG. 9 illustrates one embodiment of a method of scanning entries in a reassignment table.

FIG. 9 illustrates one embodiment of a method 900 for scanning a reassignment table to identify and remove false data storage location reassignments. Method 900 is also referred to herein as an "online" reassignment scan as it can be, under one embodiment, triggered during and/or associated with a data operation in the data storage system. In one example, method 900 is triggered when the data storage system is not idle. For example, method 900 begins at block 901 when a data read or write operation is initiated.

In the embodiment illustrated in FIG. 9, the method 900 begins at block 901 when a write command is received from a host. Method 900 is described below in context of the reassignment table 400 illustrated in FIG. 4A, which is not intended to limit the scope of the concepts described herein.

As illustrated in block 902, the exemplary write command includes logical block addresses (LBAs) 1000 to 2000. Using translation or mapping information, for example, the data storage system identifies the appropriate physical block addresses (PBAs) for the LBAs 1000-2000 in the write command. For instance, in the embodiment illustrated in FIG. 4A, LBAs 100, 200, 300, 400, 500, 600, etc. are mapped to PBAs 100, 200, 300, 400, 500, 600, etc., respectively. However, any suitable logical to physical address mapping can be utilized.

In one embodiment, one or more of the original physical block addresses (PBAs) mapped to the LBAs in the write command at step 902 are included in entries (i.e., in column 402) in reassignment table 400. In another embodiment, none of the original physical block addresses mapped to LBAs in the write command are included in entries in the reassignment table 400.

The write operation is executed by the data storage system. At step 904, the method determines whether the write operation completed early. In one embodiment, step 904 checks a command timeout for the write command to determine if any residual time in the timeout period for the command remains. If the method determines that there is no residual time, or that any residual time is insufficient for a reassignment scan, the method proceeds to step 906 wherein a transfer complete or "command complete" status is returned to the host. The method ends at block 903.

If step 904 determines that the data operation completed with sufficient residual time in the command timeout period, the method proceeds to step 908. Step 908 performs a reassignment scan of the reassignment table 400 during the residual portion of the command timeout period. Step 908 accesses the reassignment table 400 and checks column 408 to select one or more un-scanned reassignments. It is noted that the data storage locations that are analyzed for media defects in method 900 can comprise storage locations having addresses included in the write command as well as data storage locations having addresses that are not included in the write command. Further, method 900 can also utilize column 406 to process pending reassignment entries.

At step 910, the method performs a mini-cert operation on the deallocated or original data storage location(s) for the un-scanned and/or pending reassignments) selected at step 908. If an original data storage location passes the mini-cert operation, the method proceeds to step 914 wherein the data in the alternate data storage location (identified in column 404 of table 400) is copied back to the original storage location. The corresponding reassignment entry in the table 400 is removed.

If an original data storage location does not pass the mini-cert operation at step 912, the method proceeds to step 916 wherein the corresponding entry in the reassignment table 400 is marked as a "true" reassignment. In one example, a flag in column 408 is set to a true or "Yes" value.

The method proceeds to step 918 wherein the method determines, based on the command timeout period, whether sufficient time remains to perform one or more additional reassignment scans. If yes, the method returns to step 908. Otherwise, the method proceeds to step 906 wherein a transfer complete or "command complete" status for the write command is returned to the host.

It is noted that while method 900 is described in the context of a write command, aspects described herein can also be applied for other data operations such as, but not limited to, read operations.

It is to be understood that even though numerous characteristics and advantages of various examples have been set forth in the foregoing description, together with details of the structure and function of various embodiments, this disclosure is illustrative only, and changes may be made in detail, especially in matter of structure and arrangement of parts within the principles of the disclosure to the full extent indicated by the broad general meaning of the terms in which the appended claims are expressed. For example, the particular elements may vary depending on the particular application for data storage location reassignment while maintaining substantially the same functionality without departing from the scope of the disclosure and/or the appended claims. In addition, although examples described herein are directed to a data storage system for non-volatile storage of data, it will be appreciated by those skilled in the art that the teaching of the disclosure can be applied to the correction of errors in volatile memory or dynamic memory, without departing from the scope of the disclosure and/or claims.

What is claimed is:

1. A method comprising:
   receiving a command for a data operation for a first set of addresses associated with storage locations of a data storage medium;
   performing the data operation on the data storage medium for the first set of addresses during a first portion of a time period associated with execution of the command received for the data operation; and
   scanning at least one storage location for media defects during a second portion of the time period, wherein the at least one storage location has an address that is different than the addresses in the first set.

2. The method of claim 1, wherein the time period comprises a command timeout period associated with the command received for the data operation.

3. The method of claim 2, wherein the command received for the data operation is received from a host device and the command timeout period comprises a host command timeout period defining a period for completion of the data operation.

4. The method of claim 3, and further comprising:
   receiving a time value associated with the host command timeout period from the host device.

5. The method of claim 3, and further comprising:
   estimating a time value associated with the host command timeout period based on the command received for the data operation.

6. The method of claim 3, wherein the second portion of the time period comprises a residual portion of the host command timeout period.

7. The method of claim 3, and further comprising:
   after scanning the at least one storage location, returning a command completion status for the command to the host device.

8. The method of claim 1, wherein scanning comprises:
   accessing a database of reassignment information including entries that map original data storage locations to alternate data storage locations;
   selecting one or more of the entries in the database; and
   scanning the original data storage locations associated with the one or more entries for media defects.

9. The method of claim 8, wherein the original data storage locations that are scanned for media defects have addresses that are not included in the first set of addresses for the data operation.

10. The method of claim 8, wherein the database comprises a reassignment table having a plurality of reassignment entries, and wherein each reassignment entry includes a first field identifying an original data storage location, a second field identifying an alternate data storage location to which the original data storage location has been reassigned, and a third field indicating whether the reassignment entry has been scanned.

11. The method of claim 10, comprising:
   for each of the one or more selected entries in the reassignment table,
      writing a portion of data to the original data storage location associated with the entry in the reassignment table;
      reading the portion of data from the original data storage location;
      determining whether the original storage location contains media defects;
      if the original data storage location is determined to not contain a media defect, removing the entry for the original data storage location from the database; and if the original data storage location is determined to contain a media defect, adjusting the third field associated with the entry to validate the entry.

12. A method comprising:

scanning a de-allocated storage location for a media defect while executing a read/write command;

removing a reassignment table entry if no media defect is detected during the scanning step;

writing to the de-allocated storage location; and copying data from an alternate storage location to the de-allocated storage location.

\* \* \* \* \*